United States Patent
Le Calve et al.

[11] Patent Number: 6,161,668
[45] Date of Patent: *Dec. 19, 2000

[54] FREEWHEEL DEVICE WITH RETAINING ENDPLATE AND METHOD FOR FITTING THE ENDPLATE

[75] Inventors: Marc Le Calve, Saint Cyr sur Loire; Yves André Liverato, Sainte Paterne Racan; Christophe Houdayer, Tours, all of France

[73] Assignee: SKF France, France

[*] Notice: This patent issued on a continued prosecution application filed under 37 CFR 1.53(d), and is subject to the twenty year patent term provisions of 35 U.S.C. 154(a)(2).

[21] Appl. No.: 09/020,249

[22] Filed: Feb. 6, 1998

[30] Foreign Application Priority Data

Feb. 25, 1997 [FR] France .................... 97 02235

[51] Int. Cl.⁷ .................................. F16D 11/06
[52] U.S. Cl. .......................... 192/41 A; 192/41.5
[58] Field of Search ............... 192/45.1, 41 A; 188/82.8

[56] References Cited

U.S. PATENT DOCUMENTS

| | | | |
|---|---|---|---|
| 2,670,825 | 3/1954 | Cherry | 192/45.1 |
| 3,006,447 | 10/1961 | Irwin . | |
| 3,022,875 | 2/1962 | Davis | 192/45.1 |
| 4,494,636 | 1/1985 | Wakabayashi et al. | 192/41 A |
| 4,736,827 | 4/1988 | Kinoshita . | |
| 4,792,028 | 12/1988 | Nishimura et al. | 192/41 A |
| 5,076,408 | 12/1991 | Numata et al. | 192/41 A |
| 5,139,123 | 8/1992 | Rutke . | |
| 5,415,258 | 5/1995 | Numata . | |
| 5,570,766 | 11/1996 | Sato et al. | 192/45.1 |
| 5,664,653 | 9/1997 | Kurita et al. | 192/41 A X |
| 5,687,826 | 11/1997 | Kinoshita et al. | 192/45.1 X |

FOREIGN PATENT DOCUMENTS

| | | |
|---|---|---|
| 447026 | 9/1991 | European Pat. Off. . |
| 478891 | 4/1992 | European Pat. Off. . |
| 2588240 | 10/1987 | France . |
| 5026263 | 2/1993 | Japan . |

OTHER PUBLICATIONS

French Search Report dated Oct. 9, 1997.

*Primary Examiner*—Sherry Estremsky
*Assistant Examiner*—Roger Pang
*Attorney, Agent, or Firm*—Smith, Gambrell & Russell, LLP

[57] ABSTRACT

Freewheel device 1, of the type comprising an outer race 2 which has an inner track 3, an inner race 4 which has an outer track 4, a freewheel 6 situated between the tracks of the said races, at least one member 7 forming a bearing intended to keep the said races 2, 4 concentric, and at least one lateral retaining endplate 12, secured to one of the races in order axially to hold the freewheel 6 and the member forming the bearing with respect to the said race. The endplate 12 comprises a first radial portion 12a adjacent to the corresponding holding member 7 for retaining it axially, and a second more or less radial portion 12b cut into tabs projecting into an annular groove 21 formed in one of the races, the said endplate coming into contact with a side wall 21a of the said groove.

15 Claims, 5 Drawing Sheets

FREEWHEEL DEVICE WITH RETAINING ENDPLATE AND METHOD FOR FITTING THE ENDPLATE

The present invention relates to the field of freewheel devices capable of transmitting torque in one direction of rotation and of operating as a freewheel in the other direction of rotation, that is to say of not transmitting torque.

Freewheel devices generally comprise an outer race which has a cylindrical inner track, an inner race or a shaft which has an outer cylindrical track, and a freewheel situated between the inner track of the outer race and the outer track of the inner race or of the shaft, and comprising a number of wedging cams held by a cage. A spring may be installed to make sure that the cams tilt towards the position in which they can take up torque.

One or more members forming bearings, intended to maintain perfect concentricity between the outer race and the inner race and transmit the radial forces between the said races are also fit ed. One or two lateral retaining endplates secured to one of the races are provided with the purpose of axially holding and positioning the freewheel with respect to the said race.

A freewheel device of this kind makes it possible to achieve a one-way coupling between the outer race and the inner race. The Lateral retaining endplate or endplates serve to prevent any possible disassembly. A subassembly comprising the freewheel, the members that form bearings, the race on which these are fixed, and the lateral retaining endplate or endplates can thus be handled without the risk of losing parts.

Once the subassembly has been mounted in the mechanical member that is to accommodate it, the lateral endplates continue to prevent any possible disassembly and to provide the relative axial positioning of the freewheel and of the members that form the bearings during operation. When the lateral endplates project from the face of the race which supports them, the said endplates can also act as spacer pieces or as anti-friction discs with other adjacent components of the freewheel device. In this case, the endplates will be made of an anti-friction material such as bronze, or brass, or will be coated with anti-friction material.

Conventional systems employing claw- or hook-type attachment systems which clip in or are crimped in order to secure the lateral retaining endplates to one of the races of the freewheel are knows from the prior art.

For example, document EP-A-0 478 891 relates to a freewheel device using lateral retaining endplates whose means of attachment to the outer race involve hooks situated on or towards the periphery of the outer race.

Endplate attachment tabs project radially from the periphery of the outer race, and this means that the assembly has a greater radial bulk, but there is the risk that the ends of the fixing tabs will become caught or damaged while the freewheel device is being handled, and of accidental disassembly of said lateral endplates, and that the freewheel device might be more difficult to fit in the mechanical member that is to accommodate it, for example an automatic gearbox torque converter.

Furthermore, when the race supporting the endplates has radial teeth or splines for rotationally coupling it to a concentric component comprising coupling means of a complementary shape, other drawbacks may arise.

In the embodiment of FIGS. 1 and 2, the fixing tabs interact with a groove machined in the radial teeth. There is a risk that the groove will locally weaken these.

In the embodiment of FIG. 3, the groove is provided outside of and set back from the teeth radially and axially, and this is appropriate only to applications in which the torques to be transmitted are low so as to be compatible with a tooth breadth which is low because otherwise the overall axial size would be large.

If the catching tabs interact with grooves machined in the cutouts in the outer race between the teeth, like in FIG. 4, then machining such an outer race comprising teeth, cutouts and a groove machined in the bottom of the cutouts is relatively complicated.

The object of the present invention is to overcome the drawbacks of the conventional devices and to propose a freewheel device of small radial and axial size capable of transmitting a high torque, which is simple and economical to manufacture and easy to handle.

The freewheel device according to the present invention is of the type comprising an outer race which has an inner track, an inner race which has an outer track, a freewheel situated between the tracks of the said races, at least one member forming a bearing intended to keep the said races concentric, and at least one lateral retaining endplate, secured to one of the races in order axially to hold the freewheel and the member forming the bearing with respect to the said race, and comprising a first radial portion adjacent to the corresponding bearing-forming member for retaining it axially. The endplate comprises a second more or less radial portion cut into tabs projecting into an annular groove formed in one of the races, the said endplate coming into contact with a side wall of the said groove. This groove does not give rise to any additional bulk and can be obtained by a simple turning operation. The endplate can be manufactured by cutting a sheet metal blank then, as appropriate, pressing in accordance with the shape of the tabs.

A groove may be formed on the cylindrical outer surface of the inner race. A groove may also be formed in the bore of the outer race.

In another embodiment of the invention, a groove is formed from a radial face of the outer race. The endplate may then comprise an oblique connecting portion situated between the said first and second portions and extending from the said first portion radially towards the second portion and axially towards the cams. It is possible to provide an additional radial portion situated in line with the first radial portion and extending beyond the tabs.

In another embodiment of the invention, the endplate comprises second and third radial portions cut into tabs situated respectively on the outer edge and on the inner edge of the first radial portion and projecting respectively into an annular groove of the outer race and into an annular groove of the inner race. An endplate of this kind also secures the two races axially.

Another subject of the present invention is a method for fitting an endplate comprising a radial disc and a row of tabs situated on one of the edges of the disc, into an annular groove in an inner or an outer race of a freewheel device. An axial force is exerted on the endplate in order to deform it elastically, giving it a conical shape that allows the tabs to be inserted into the groove, then the said force is released so that the endplate reverts to its initial shape, the tabs projecting into the said groove.

A freewheel device is thus obtained which is particularly simple and economical to manufacture. The assembly is easier to handle once the endplate or endplates have been mounted, because the assembly formed by a race, the freewheel and the lateral bearings can now not be disassembled without tools, thus preventing any accidental loss of parts.

The invention will be better understood from studying the detailed description of a number of embodiments taken by way of non-limiting examples and illustrated by the appended drawings, in which.

Figure 1:
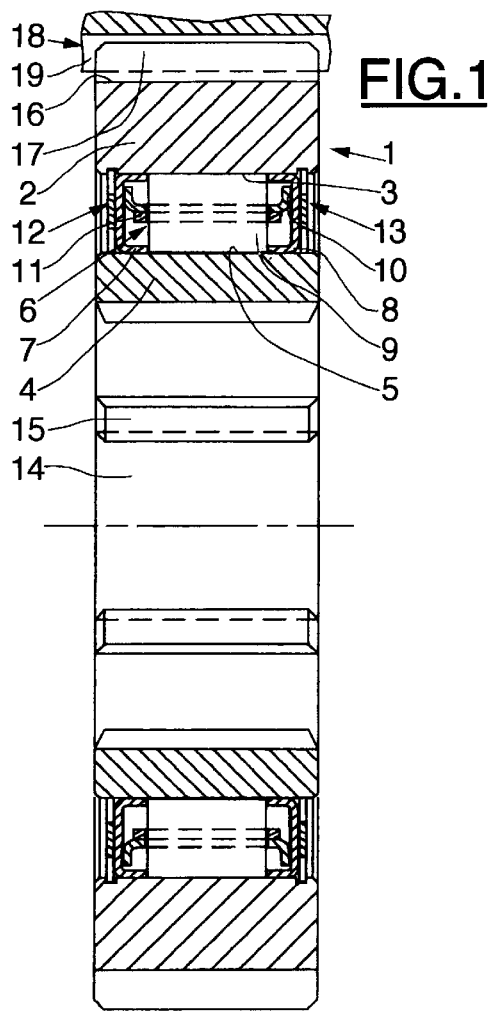
FIG. 1 is a view in axial section of a freewheel device according to the present invention.
Figure 2:
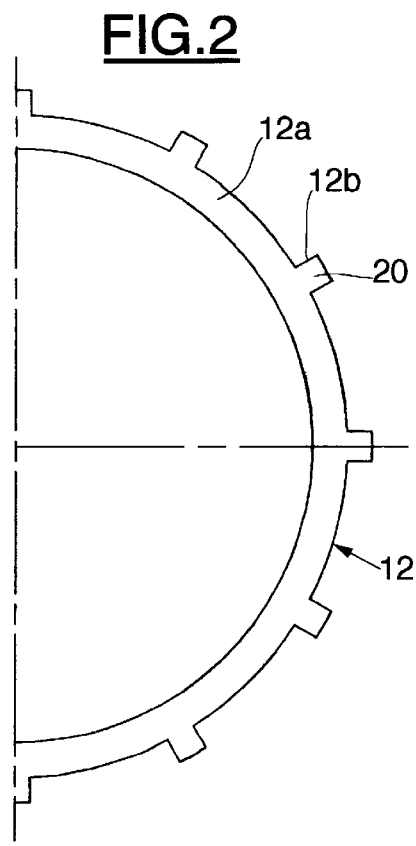
FIG. 2 is a half view in front elevation of the endplate of FIG. 1.
Figure 3:
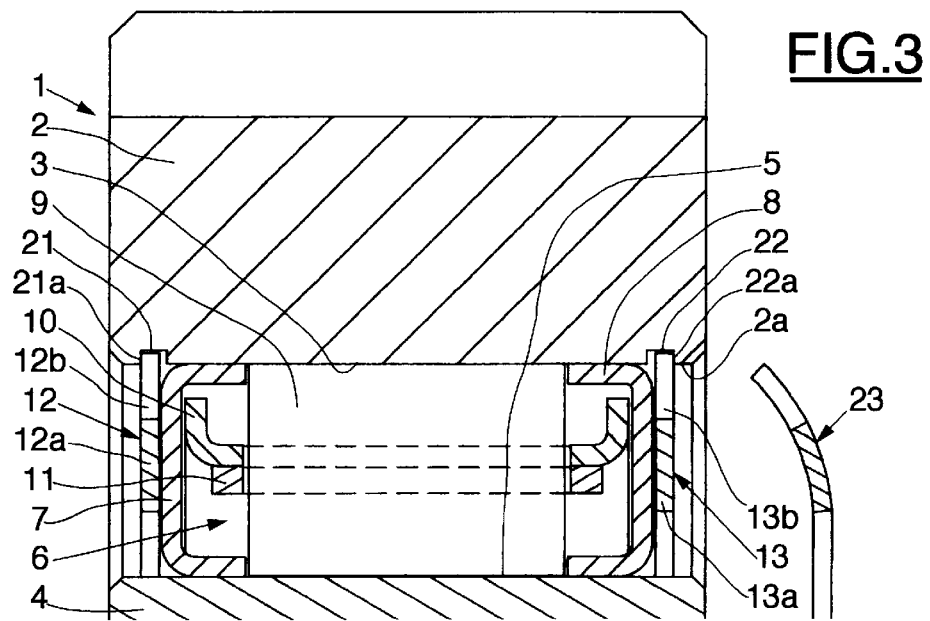
FIG. 3 is a detail view corresponding to FIG. 1.

As can be seen in FIGS. 1 to 3, the freewheel device 1 comprises an outer race 2 provided in its bore 2a with a track 3, an inner race 4 provided on its outer cylindrical surface with a track 5, a freewheel 6 situated between the inner track 3 of the outer race 2 and the outer track 5 of the inner race 4, and two lateral bearings 7 and 8 intended to keep the outer race 2 and the inner race 4 concentric.

The freewheel 6 comprises a row of cams 9 held by a cage 10, and a spring 11 in the form of a band for tilting the cams 9 in the direction that encourages them to wedge between the said outer track 3 and inner track 5. The bearings 7 and 8 are situated axially one on either side of the freewheel 6, are push-fitted into the bore in the outer race 2 in immediate proximity to the track 3 and are in contact with the cylindrical outer surface of the inner race 4 in immediate proximity to the track 5.

On its bore 14, the inner race 4 is provided with a number of teeth 15 uniformly circumferentially spaced and intended to transmit a torque to a mechanical member, not depicted, on which the inner race 4 is mounted. Likewise, the outer race 2 on its outer cylindrical surface 16 comprises a number of teeth 17 cooperating with a view to transmitting a torque with the mechanical member 18, depicted partially, in which the outer race 2 is mounted. The mechanical member 18 comprises teeth 19 of an appropriate shape for interacting with the teeth 17. The latter are formed across the entire axial width of the outer race 2.

The freewheel device 1 also comprises two lateral holding endplates 12 and 13 which are identical and mounted one on each side of the freewheel 6. The endplates 12 and 13 are in the form of a radial disc comprising a first solid radial portion 12a, 13a, and a second radial portion 12b, 13b cut into tabs 20 distributed around the periphery of the first portion 12a, 13a.

The bore 2a of the outer race 2 has two annular grooves 21, 22 situated respectively in close proximity to each bearing 7, 8, axially on the outside of the freewheel 6 and of the bearings 7, 8. The grooves 21, 22 have a radial edge 21a, 22a axially opposite the bearings 7, 8. The endplates 12 and 13 are situated in such a way that their portions 12b, 13b cut into tabs 20 project into the grooves 21, 22.

In FIG. 3, the element referenced 23 corresponds to the endplate 13 in the position in which it is offered up to the bore 2a in the outer race 2 in order to insert it into the groove 22. Using an appropriate tool, the endplate 23 is elastically deformed, giving it a domed shape similar to that of an umbrella so as to allow the tabs 20 to enter the bore 2a of the outer race 2. The force of the mechanical tool, not depicted, is then released and the endplate reverts to its radial initial shape, the tabs 20 projecting into the groove 22.

Figure 4:
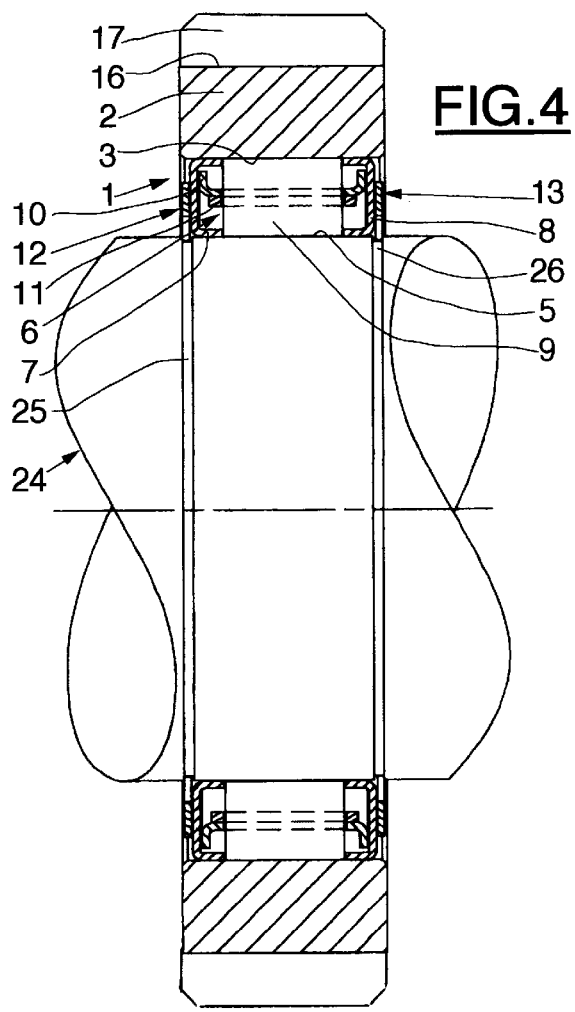
FIG. 4 is a view in axial section of a freewheel device according to another embodiment of the invention.
Figure 5:
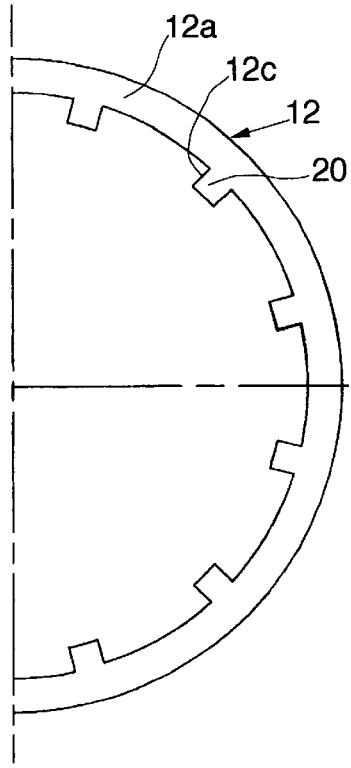
FIG. 5 is a half view in front elevation of the endplate of FIG. 4.
Figure 6:
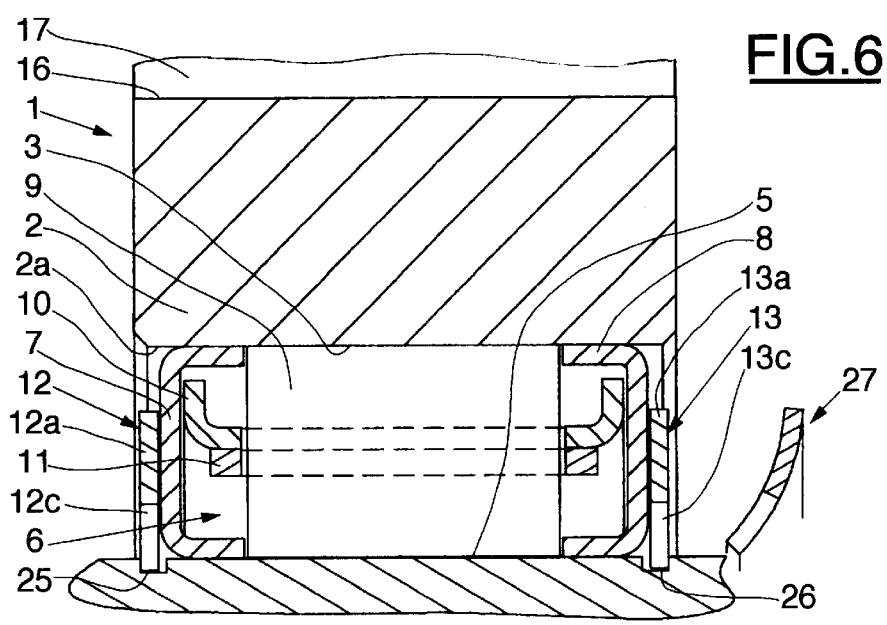
FIG. 6 is a detail view of FIG. 4.

In FIGS. 4 to 6, the references for elements which are similar to those in the previous figures have been kept. The inner race here is replaced by a shaft 24 provided with a track 5 for the cams 9. The shaft 24 has two grooves 25, 26 situated on its outer cylindrical surface axially at the same location as the grooves in the previous embodiment. The second portion 12c, 13c of the endplates 12 and 13 extends from the inside diameter of the first portions 12a, 13a and projects into the grooves 25 and 26. This then axially secures the shaft 24 to the freewheel 6. The element referenced 27 in FIG. 6 represents the endplate 13 which is given a domed shape so that it can be mounted about the shaft 24.

Figure 7:
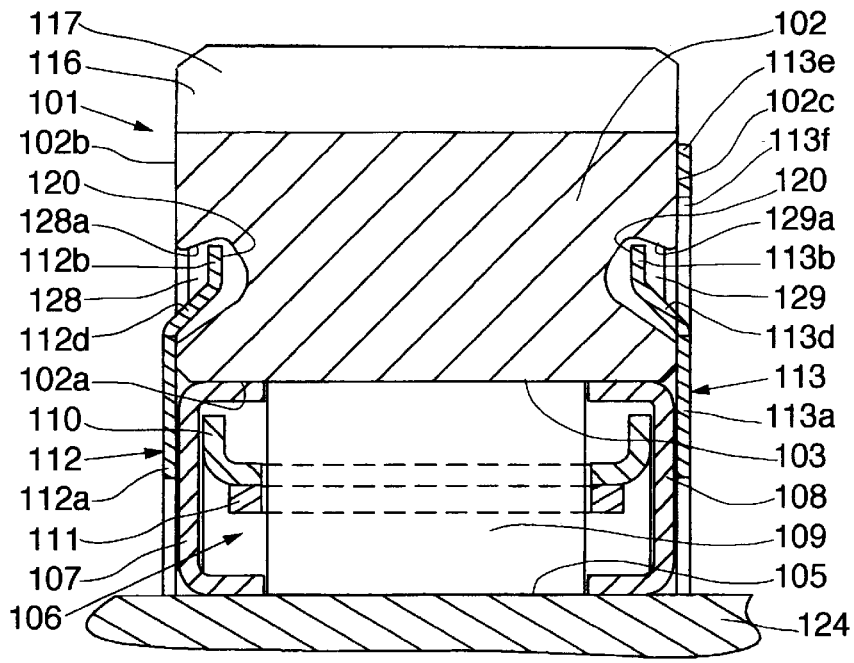
FIG. 7 is a part view in axial section of a freewheel device according to another embodiment of the invention, which can accommodate endplates of two different types.
Figure 8:
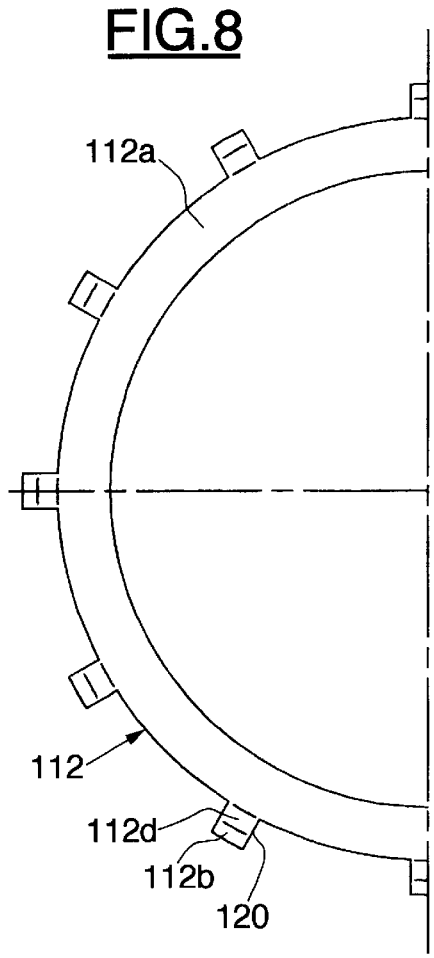
FIG. 8 is a half view in front elevation of an endplate of a first type of FIG. 7.
Figure 9:
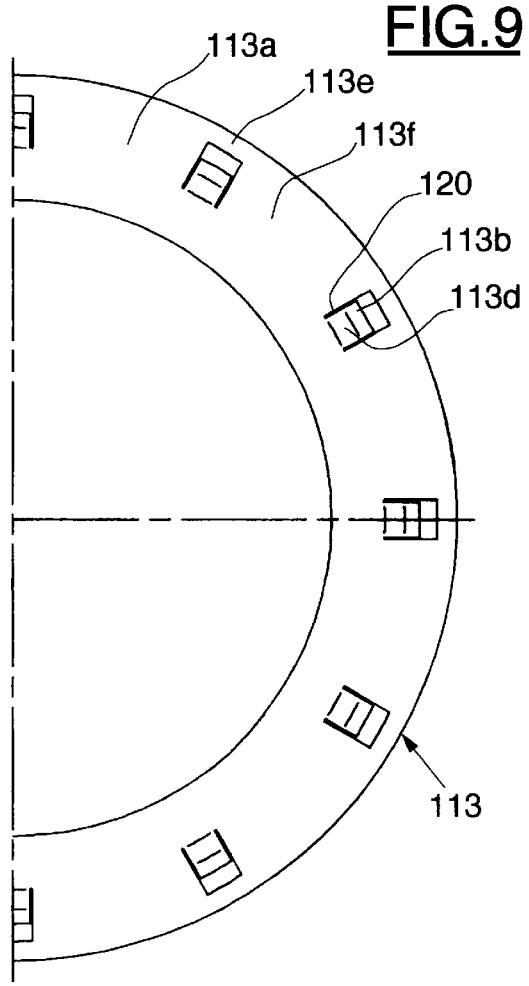
FIG. 9 is a half view in front elevation of an endplate of a second type in FIG. 7.

In FIGS. 7 to 9, the references of elements which are similar to those in the previous figures have been increased by the number 100. The bearings 107 and 108 are situated axially in such a way as to lie flush with the radial lateral surfaces 102b, 102c of the outer race 102. The outer race 102 on each lateral surface 102b, 102c, has an oblique groove 128, 129. The oblique grooves 128, 129 are symmetric about the mid-plane of the freewheel device 101. The grooves 128, 129 are annular and extend radially outwards and axially towards the mid-plane of the freewheel device 101. The outer edge of the grooves 128, 129 comprises an oblique surface 128a, 129a. These grooves 128, 129 are designed to be obtained in a single turning operation, for example using oblique transverse feed.

The endplate 112 comprises an oblique connecting portion 112d situated between the first radial portion 112a and the second radial portion 112b. The second radial portion 112b and the connecting portion 112d are cut into tabs 120 and project into the groove 128. The periphery of the second radial portion 112b has a diameter that slightly exceeds that of the entry into the groove 128, so that it will butt against the surface 128a in the event of any attempt at disassembly. The endplate 128 may be fitted simply by exerting force on the tabs 120 to make them flex.

An endplate 113 which differs slightly from the previous one is provided on the other side of the outer race 102. The endplate 113 actually comprises an additional radial portion 113e situated in the same radial plane as the first radial portion 113a and situated between the groove 129 and the outer cylindrical surface 116 of the outer race 102. This additional radial portion 113e is connected to the first radial portion 113a by a radial connecting portion 113f from which the tabs 120 are provided. This then yields an endplate 113 which is very rigid and which can be formed from a sheet metal blank in the shape of a radial disc by cutting and forming the tabs 120. To mount the endplate 113 on the outer race 102, use is made of the elasticity of the tabs 120, forcing them to flex before positioning the endplate 113 on the outer race 102, the said tabs 120 then expanding by elasticity into the groove 129 when the force on the tabs 120 is released.

This type of endplate which bears against the lateral surface of a race may advantageously act as a separating and friction member with an axially adjacent mechanical member. For example, in the case of two freewheel assemblies mounted in tandem, the endplates act as a spacing washer between the contiguous races which can thus rotate at different speeds without rubbing against one another directly.

Figure 10:
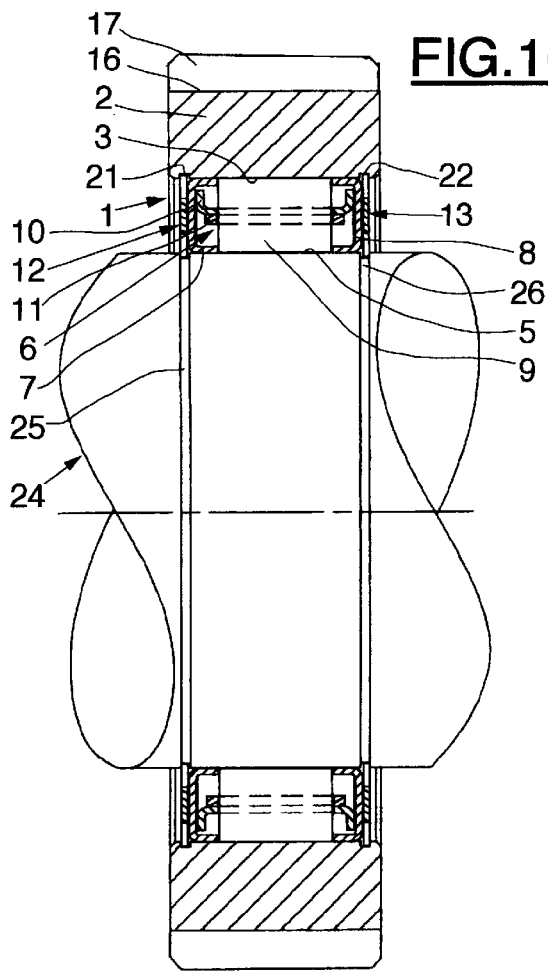
FIG. 10 is a view in axial section of a freewheel device according to another embodiment of the invention.
Figure 11:
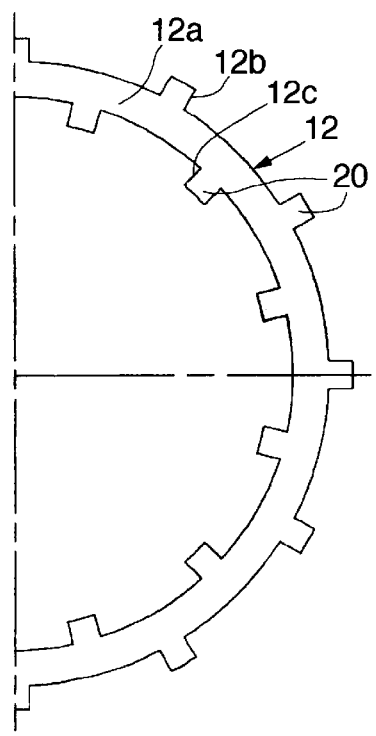
FIG. 11 is a half view in front elevation of the endplate of FIG. 10.
Figure 12:
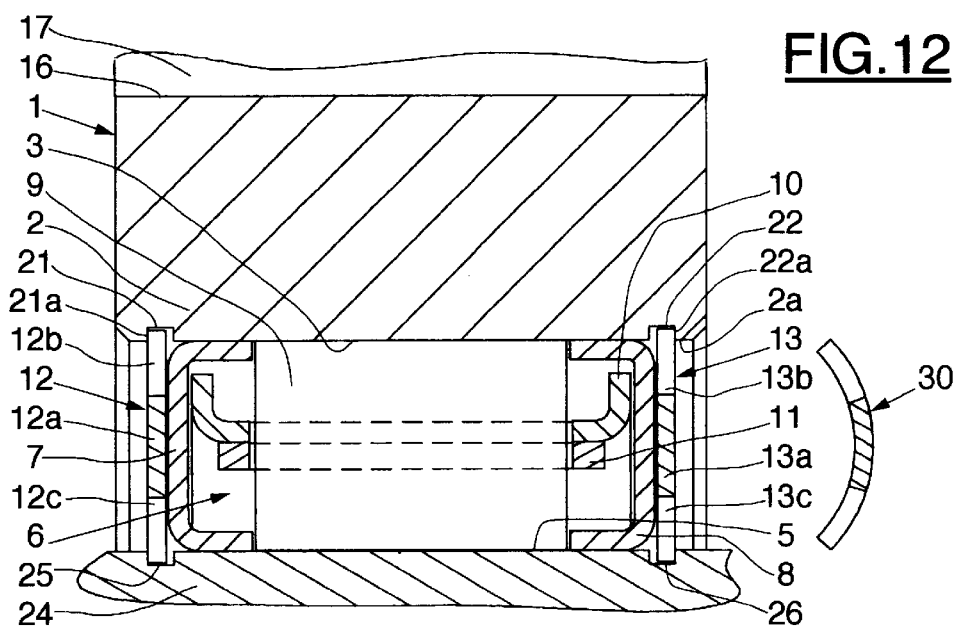
FIG. 12 is a detail view of FIG. 10.

The embodiment in FIGS. 10 to 12 is to be compared with the first two embodiments.

The outer race 2 has grooves 21, 22. The shaft 24 has grooves 25, 26 and the endplates 12 and 13 comprise both a second radial portion 12b cut into tabs 20 and situated at the periphery of the first radial portion 12a and a third radial portion 12c also cut into tabs 20 and situated on the inner edge of the first radial portion 12a. The second radial portion 12b projects into the groove 21 in the outer race 2 and the third radial portion 12c projects into the groove 25 of the shaft 24. This then additionally secures the outer race 2 and the shaft 24 together axially.

In FIG. 12, the element referenced 30 represents the endplate 13 which is given a domed shape similar to that of an umbrella to allow it to negotiate both the bore 2a of the outer race 2 and the outer cylindrical surface of the shaft 24 before positioning itself, by radial expansion, in the grooves 22 and 26. This freewheel device constitutes a complete assembly that cannot be disassembled without tools and is therefore easy to handle.

Figure 13:
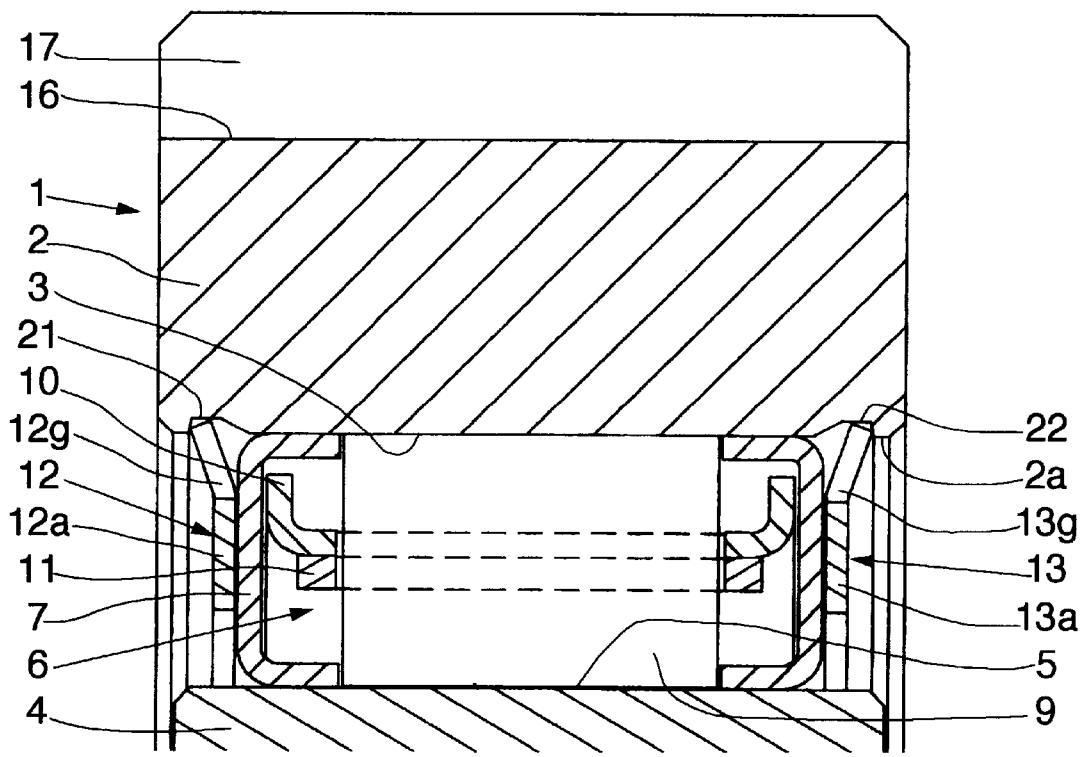
FIG. 13 is a part view in axial section of another embodiment of the invention.

In FIG. 13, the endplates 12 and 13 comprise a radial portion 12a, 13a, and a more or less radial portion 12g, 13g cut into tabs 20 situated on the periphery of the radial portion 12a, 13a and extending radially outwards and axially away from the bearings 7, 8. The portion 12g, 13g may be slightly oblique once the endplates 12, 13 have been fitted, on account of the shallow depth of the grooves 21, 22. These endplates 12, 13 may be fitted simply using a press, deforming only the tabs 20. They are therefore very economical to mount.

Thanks to the invention, a freewheel device is obtained which has a smaller axial bulk, especially when compared with those that employ circlips. Contact between the endplate and the bearing takes place over a smooth and continuous surface. The endplate can be made from a material that has a low coefficient of friction in order to reduce wear. Finally, there is the possibility of using the endplate to provide an axial connection between the two races.

What is claimed is:

1. A freewheel device comprising:
    an outer race which has an inner track;
    an inner race which has an outer track, at least one of the races having at least one annular groove;
    a freewheel situated between the tracks of the races;
    at least one bearing-forming member forming a bearing that holds the races concentric; and at least one lateral retaining endplate secured to one of the races, the at least one endplate axially holding the freewheel and the bearing-forming member with respect to the race, the endplate including a first radial portion adjacent to the corresponding bearing-forming member for retaining the bearing-forming member axially, and a second substantially radial portion cut into tabs projecting into the at least one annular groove, the endplate coming into contact with a side wall of the groove, wherein the groove is formed in a radial fact of one of the races.

2. A freewheel device, comprising:
    an outer race which has an inner track;
    an inner race which has an outer track, the inner race having an annular groove formed on a cylindrical outer surface of the inner race;
    a freewheel situated between the tracks of the races;
    at least one bearing-forming member forming a bearing that holds the races concentric; and
    at least one lateral retaining endplate secured to one of the races, said at least one endplate being a radial disc which is circumferentially continuous, the at least one endplate axially holding the freewheel and the bearing-forming member with respect to the race, the endplate including a first radial portion adjacent to the corresponding bearing-forming member for retaining the bearing-forming member axially, and a second substantially radial portion with tabs projecting into the at least one annular groove, the endplate coming into contact with a side wall of the groove, the first portion being in contact with the bearing-forming member.

3. A freewheel device, comprising:
    an outer race which has an inner track, the outer race having an annular groove formed in a bore of the outer race;
    an inner race which has an outer track;
    a freewheel situated between the tracks of the races;
    at least one bearing-forming member forming a bearing that holds the races concentric; and
    at least one lateral retaining endplate secured to one of the races, said at least one endplate being a radial disc which is circumferentially continuous, the at least one endplate axially holding the freewheel and the bearing-forming member with respect to the race, the endplate including a first radial portion adjacent to the corresponding bearing-forming member for retaining the bearing-forming member axially, and a second substantially radial portion with tabs projecting into the at least one annular groove, the endplate coming into contact with a side wall of the groove, the first portion being in contact with the bearing-forming member.

4. A freewheel device, comprising:
    an outer race which has an inner track;
    an inner race which has an outer track, at least one of the outer and inner races having at least one annular groove formed in a radial face thereof;
    a freewheel situated between the tracks of the races;
    at least one bearing-forming member forming a bearing that holds the races concentric; and
    at least one lateral retaining endplate secured to one of the races, said at least one endplate being a radial disc which is circumferentially continuous, the at least one endplate axially holding the freewheel and the bearing-forming member with respect to the race, the endplate including a first radial portion adjacent to the corresponding bearing-forming member for retaining the bearing-forming member axially, and a second substantially radial portion with tabs projecting into the at least one annular groove, the endplate coming into contact with a side wall of the groove, the first portion being in contact with the bearing-forming member.

5. A freewheel device, comprising:
    an outer race which has an inner track, the outer race having a first annular groove in a bore thereof;
    an inner race which has an outer track, the inner race having a second annular groove in a cylindrical outer surface thereof;
    a freewheel situated between the tracks of the races;
    at least one bearing-forming member forming a bearing that holds the races concentric; and
    at least one lateral retaining endplate secured to one of the races, said at least one endplate being a radial disc which is circumferentially continuous, the at least one endplate axially holding the freewheel and the bearing-forming member with respect to the race, the endplate including, a first radial portion adjacent to the corresponding bearing-forming member for retaining the bearing-forming member axially, the first radial portion being in contact with the bearing-forming member, a second substantially radial portion with tabs projecting into at least one of the first and second annular grooves, the endplate coming into contact with a side wall of at least one of the first and second annular grooves, and a third radial portion, wherein the second and third radial portions include tabs situated respectively on the outer edge and on the inner edge of the first radial portion and project respectively into the groove of the outer race and into the groove of the inner race.

6. The device according to claim 1, 2, 3, 4 or 5 wherein the freewheel includes a plurality of wedging elements, each wedging element being in contact with the inner track of the outer race and with the outer track of the inner race.

7. The device according to claim 2, wherein at least one of said endplate and said bearing-forming member includes materials so that a low coefficient of friction is present where they contact.

8. The device according to claim 7, wherein the material is a coating.

9. The device according to claim 7, wherein the material is a copper-based alloy.

10. The device according to claim 9, wherein the copper-based alloy is brass.

11. The device according to claim 4, wherein the endplate comprises an oblique connecting portion situated between the first and second portions and extending from the first portion radially towards the second portion.

12. The device according to claim 11, wherein an additional radial portion is situated in line with the first radial portion and extends beyond the tabs.

13. A method for assembling a freewheel device according to claim 1, 2, 3, 4 or 5, the method comprising:

providing the endplate with the first radial portion and the second radial portion with the tabs;

exerting an axial force on the endplate so as to allow the tabs to be inserted into the groove of the at least one race; and releasing the force so that the endplate reverts to its initial shape and the tabs are received in the groove.

14. The method of claim 13 wherein exerting an axial force on the endplate includes forming a conical shape in the endplate so as to allow the tabs to be inserted into the groove.

15. The method of claim 13 wherein exerting an axial force on the endplate includes deflecting the tabs and allowing the tabs to spring back while received in the groove.

\* \* \* \* \*